Feb. 7, 1967 S. SPISAK 3,303,318
WELDING TOOL AND STUD LOADER
Filed Sept. 3, 1963 3 Sheets-Sheet 1
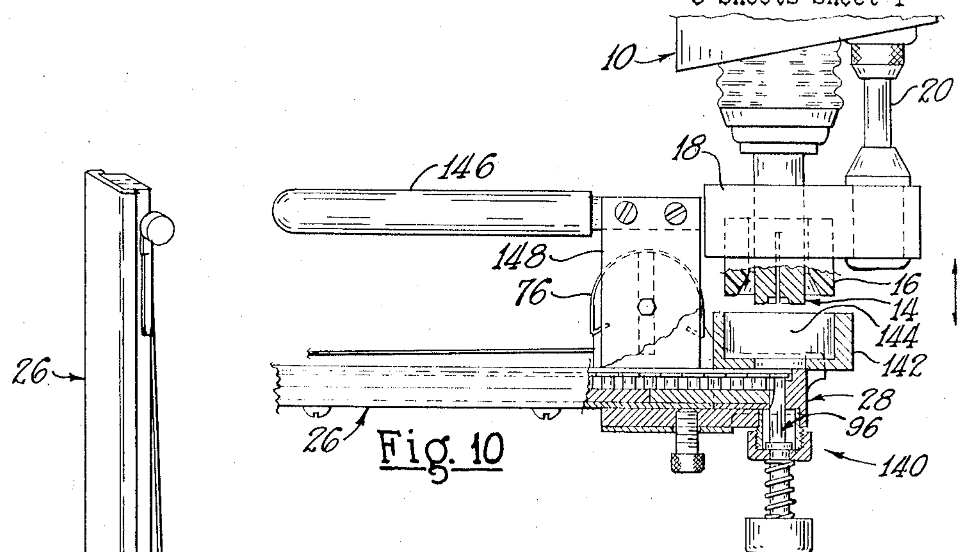
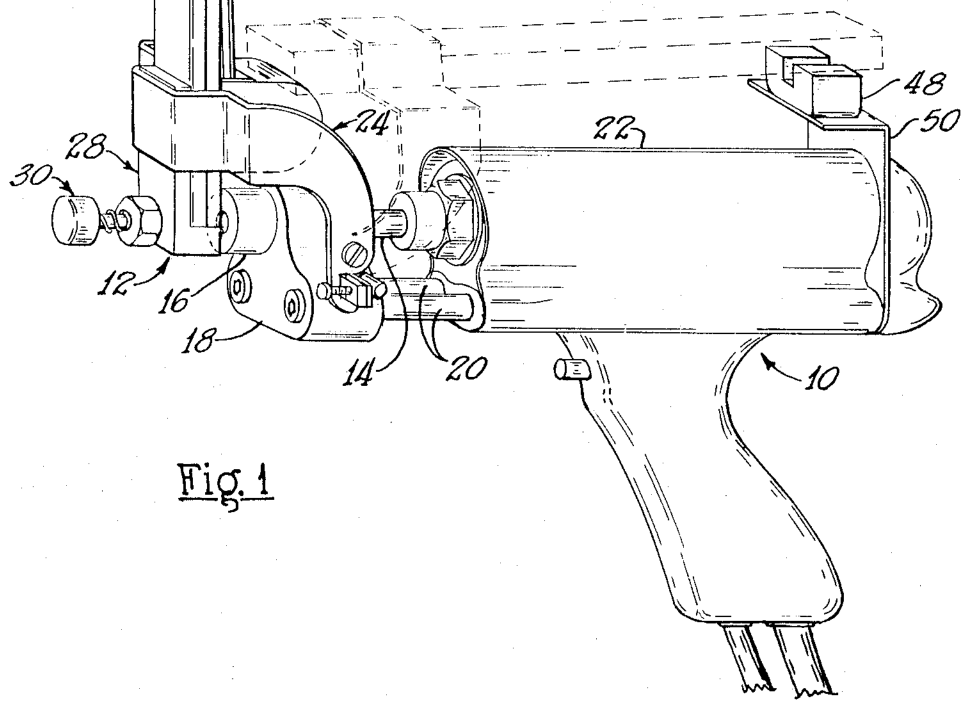
INVENTOR.
STEVE SPISAK
BY
Owen & Owen
ATTORNEYS WELDING TOOL AND STUD LOADER
Filed Sept. 3, 1963 3 Sheets-Sheet 2
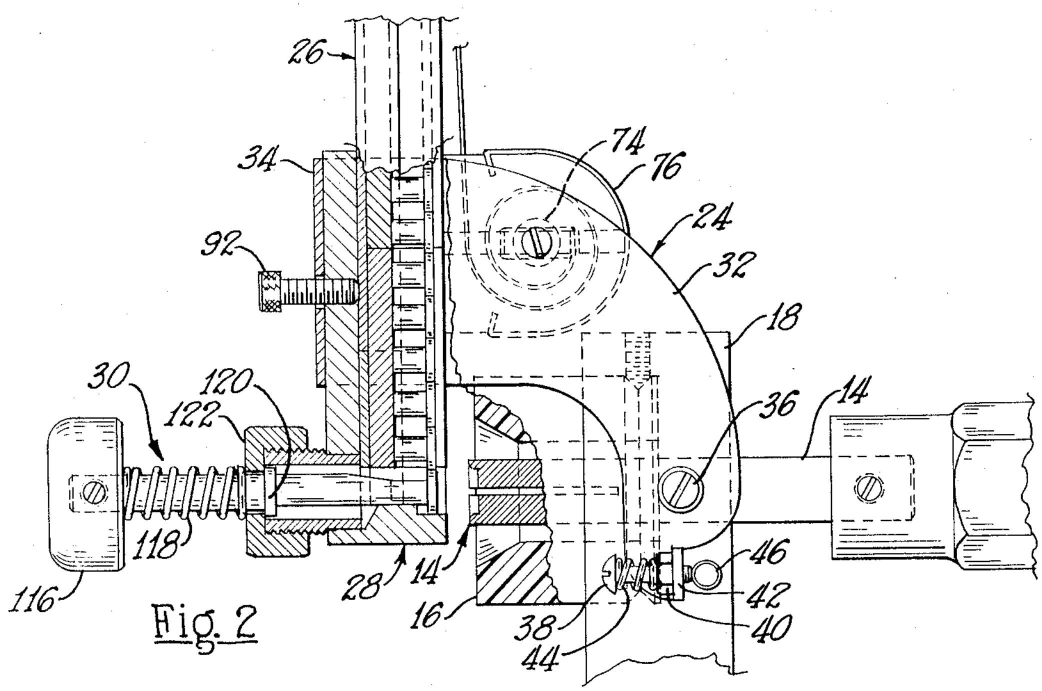
Fig. 2
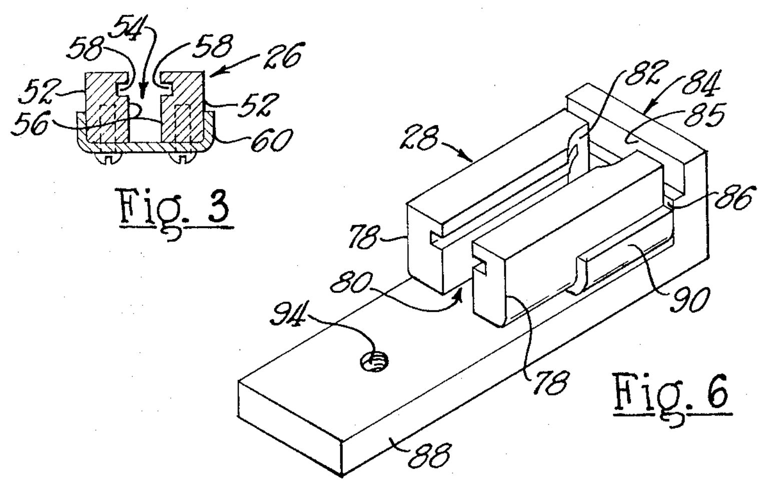
Fig. 3
Fig. 6
70
72
Fig. 5
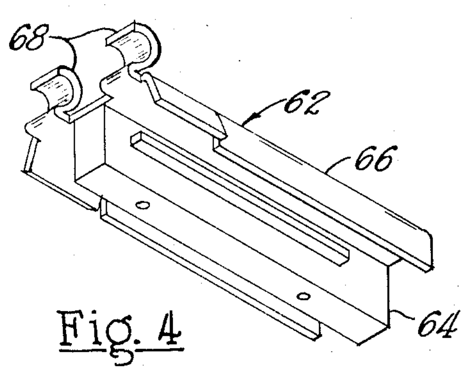
Fig. 4
INVENTOR.
STEVE SPISAK
BY
Owen & Owen
ATTORNEYS

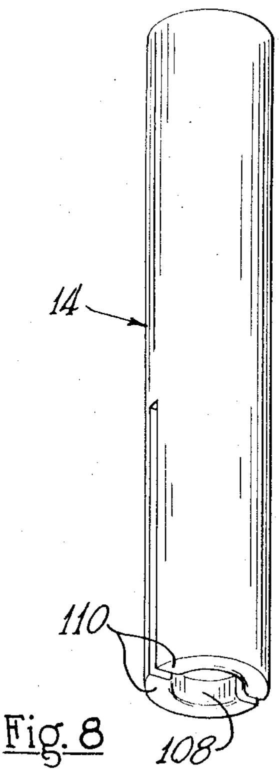
Fig. 8
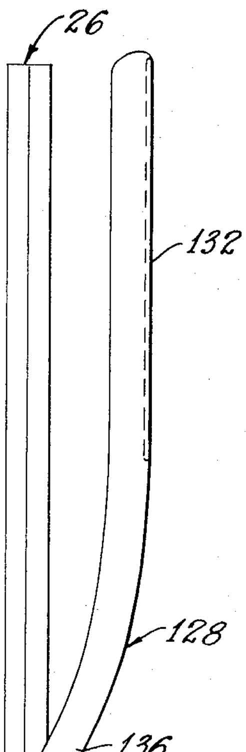
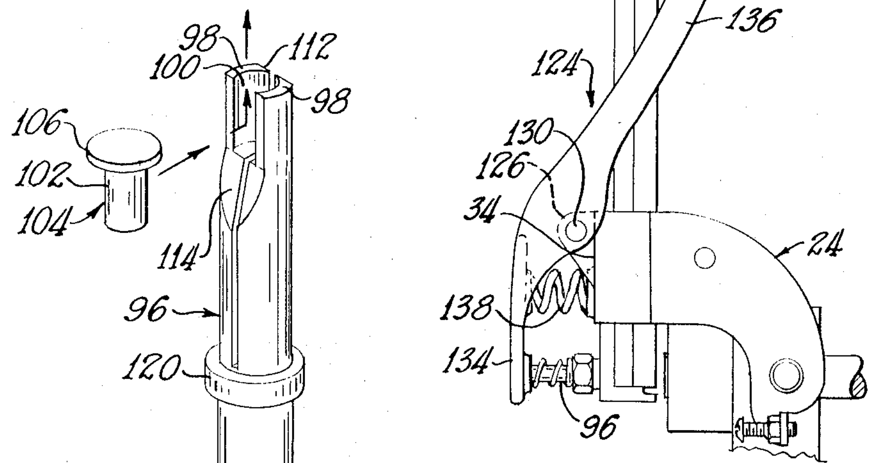
Fig. 7
Fig. 9
INVENTOR.
STEVE SPISAK
BY
Owen & Owen
ATTORNEYS United States Patent Office 3,303,318

Patented Feb. 7, 1967

3,303,318
WELDING TOOL AND STUD LOADER

Steve Spisak, Elyria, Ohio, assignor to Gregory Industries, Inc., Lorain, Ohio, a corporation of Michigan Filed Sept. 3, 1963, Ser. No. 306,132
8 Claims. (Cl. 219—98)

This invention relates to a welding tool incorporating a stud loader and more particularly to a loader for feeding studs to the chuck of a welding tool in a sequential manner between welding cycles.

Stud welding tools for end welding various types of studs to workpieces have found wide acceptance in the art. In the usual operation of a tool of this type, the stud must first be grasped by the operator, oriented to a predetermined position, aligned properly with the chuck of the welding tool which holds the stud, and, finally, inserted into the chuck. The stud is then welded to the workpiece by means of the tool. In the welding cycle performed with one type of welding tool, the stud is first pressed lightly against the workpiece to place it in good electrical contact therewith, the trigger is then pulled which causes the stud to be retracted from the workpiece and at the same time for an arc to be struck between the stud and the workpiece; frequently a pilot arc, followed by the automatic initiation of a welding arc, is employed. The stud is held automatically in the retracted position for a predetermined period during which time the welding arc persists and forms small pools of metal on the end of the stud and the workpiece at the point where the stud is to be welded. After the predetermined period, the stud is plunged automatically against the workpiece with the molten metal then solidifying to complete the weld, after which the tool is manually withdrawn and the chuck and welded stud thereby separated.

When a great number of studs are to be welded, even a small reduction in the time necessary for each weld can make a substantial difference in the overall time required to complete a particular part or welding application. One of the principal portions of the overall welding cycle or operation which can be shortened is the loading of the stud in the chuck which may occupy a period of time which is several times longer than the period required for the actual welding, the latter period being usually a matter of no more than one or two seconds. This is particularly true for smaller studs which may have a length of a fraction of an inch, one-quarter inch for example, and which are particularly difficult to handle.

The present invention relates to a loading device for a stud welding tool and to a tool incorporating such a device for simplifying and increasing the rate of loading of studs into the chuck of the tool. The loader according to the invention includes a source of supply of studs which can be automatically moved into a loading position with respect to the chuck and also to a withdrawn position out of the way of the chuck so as not to interfere with the welding cycle after loading is completed. For hand-operated welding tools, the loader can be moved between the loading position and the withdrawn position by hand although for larger tools, usually non-portable ones, the loader can be power driven and even automatically actuated at the beginning or end of a welding cycle.

In a preferred form of the invention, the studs are positioned by the supply means in a manner such that a stud can be aligned with the chuck when the supply means is moved into its loading position. The loading device also includes means for causing relative movement between the stud and the chuck which, when the stud is aligned with the chuck, will bring the stud and the chuck into engagement. Preferably, the stud is moved toward the chuck which is maintained substantially stationary until the welding cycle is to commence. This movement, again, can be accomplished either by hand or by power.

It is, therefore, a principal object of the invention to provide a loading device for facilitating the loading of studs into the chuck of a welding tool.

Another object of the invention is to provide a loading device by means of which the time required for a complete welding operation can be reduced.

Other objects and advantages of the invention will be apparent from the following detailed description of preferred embodiments thereof, reference being made to the accompanying drawing, in which:

FIG. 1 is a perspective view of a stud welding tool and a stud loader therefor, the loader being shown in a loading position in solid lines and in an inoperative, withdrawn position in dotted lines;

FIG. 2 is a fragmentary view in elevation, with parts broken away and with parts in cross section, of the stud welding tool and the stud loader of FIG. 1;

FIG. 3 is a detailed view in transverse cross section of a magazine constituting part of the loader;

FIG. 4 is a perspective view, taken from below, of a pusher used in the magazine of the loader;

FIG. 5 is a detailed, perspective view, taken from below, of a spring connection used with the pusher of FIG. 4;

FIG. 6 is a detailed, perspective view of a guide head constituting part of the loader;

FIG. 7 is a perspective view of a stud plunger rod and a stud about to be inserted thereinto;

FIG. 8 is a perspective view of a stud chuck of the tool of FIGS. 1 and 2 with a recess at the lower end to receive a stud;

FIG. 9 is a somewhat schematic view in elevation of a slightly modified stud loader according to the invention; and FIG. 10 is a fragmentary view in elevation, with parts broken away and with parts in cross section, of a welding tool and a slightly modified stud loader.

Referring to the drawings, and more particularly to FIG. 1, a basically conventional welding tool indicated at 10 is shown with a stud loader indicated generally at 12. The welding tool 10 can be of any suitable type used to weld studs in on-end positions to a workpiece, as is well known in the art. In one form of the welding tool, a stud chuck indicated at 14 is used to hold a stud to be welded. The stud in its welding position is surrounded by a permanent gas shield 16 suitably held in a welding foot 18 which is supported by two tool legs 20. The legs 20 are adjustably held in a body 22 of the tool in order to move the foot 18 toward and away from the body 22 and thereby to properly position the gas shield 16 relative to the chuck 14.

In a typical welding operation, the welder must pick up a stud, position it with the head toward the chuck 14, and frictionally engage the stud in the chuck by inserting the head thereof into a recess in the end of the chuck. With the stud finally in position, it is pressed against the workpiece to which it is to be welded, usually until the gas shield 16 contacts the workpiece around the stud. This establishes good electrical contact between the stud and the workpiece and also compresses slightly a plunging spring used to plunge the stud against the workpiece after an arc is struck. With the stud against the workpiece, the trigger of the tool 10 is pressed which actuates a lifting coil in the body 22 and causes a core connected to the chuck 14 to be drawn into the coil and thereby retract the chuck 14 and the stud to a predetermined position slightly away from the workpiece. At the same time that the retraction begins, welding power is supplied to the chuck 14 and the stud, an electrical connection previously having been made with the workpiece, to strike an arc between the stud and the workpiece. Frequently, a pilot arc is first struck to facilitate subsequent establishment of the welding arc. The stud is then held in the retracted position for a predetermined period, during which the welding arc persists and forms small pools of metal on the stud and on the workpiece. After the predetermined period, the current to the lifting coil is shut off, enabling the plunge spring to move the chuck 14 toward the workpiece and to force the stud against the workpiece during which the small pools of metal solidify to complete the weld. The tool 10 is then withdrawn from the now-welded stud so that a new stud can be placed in the chuck and another welding cycle initiated. As previously discussed, the actual welding time may be less than one or two seconds and may be substantially less than the time required for the operator to load the chuck with another stud. Further, the loading time may become almost intolerable, particularly for smaller studs and for high production runs.

To alleviate this problem, the stud loader 12 is employed. The loader 12 basically includes an attaching yoke 24 which is pivoted to the foot 18 to enable the loader 12 to be moved between a loading position as shown in solid lines in FIG. 1 and an inoperative or withdrawn position as shown in dotted lines in FIG. 1. The loader 12 further includes a supply magazine 26 for holding a supply of studs and for feeding them sequentially to a guide head 28, which serves to support and to guide a plunger assembly 30 for effecting relative movement between a stud and the chuck 14 in order to engage a stud with the chuck.

Referring now in more detail to the above-mentioned basic components of the loader 12, the supporting yoke 24 includes a pair of main side ears or legs 32 (FIG. 2) connected by a web 34, the side ears being pivotally attached to the foot 18 by suitable screws or pins 36. The loading position for the yoke 24 is determined by adjustable stops including stop screws 38 which are threadedly engaged with nuts 40 affixed to stop ears 42 which are bent from the main side ears 32. The stop screws 38 are held against rotation by springs 44 with the stop screws 38 extending through the ears 42 a predetermined distance to abut stop pins 46 extending outwardly from each side of the foot 18. The adjustable stop screws 38 can be turned in or out to enable the guide head 28 to be properly aligned with the chuck 14 when the yoke 24 is pivoted to the loading position.

When the yoke 24 is in the withdrawn position, the supply magazine 26 is swung against a magnet 48 (FIG. 1) which is supported near the rear of the body 22 by a suitable bracket 50 which can be affixed between two existing parts of the body 22 so as not to require modification of the welding tool body. The magnet 48 holds the loader 12 firmly in the withdrawn position and yet enables it to be easily moved down to the loading position between welding operations.

The supply magazine 26 includes a pair of feed bars 52 (FIG. 3) forming a feed slot or track 54 to hold the studs and direct them to the guide head 28 in a sequential manner. The feed slot 54 generally is of the contour of a stud and includes a lower portion 56 conforming to a shank of a stud and an upper portion 58 conforming to a head of a stud. The feed bars 52 are held in spaced relation by an elongated spacer 60. The magazine supply 26 also includes a pusher 62 (FIG. 4) which urges and moves the studs toward the guide head 28. The pusher 62 includes a pushing bar 64 generally conforming to the shape of the feed slot 54 and a generally inverted U-shaped supporting plate 66 guided along the upper portions of the feed bars 52. A pair of clips 68 are bent upwardly from the rear of the plate 66 to detachably receive a spring connection or pin 70 (FIG. 5). The pin 70 is attached to a flexible strip 72 which is wound around a resiliently mounted hub 74 (FIG. 2) which is urged in a counterclockwise direction to urge the strip 72 and the pin 70 toward a housing 76 in which the hub 74 is located, the housing 76 being suitably affixed to and supported by the yoke ears 32 above the supply magazine 26. The pusher is thereby urged toward the guide head 28 and moves the studs from a first, offset position to a second, aligned position under the chuck 14, when the loader 12 is in the loading position. The clip 68 and the spring pin 70, by being detachable, enable the supply magazine 26 to be removed and separated from the yoke 24 and the guide head 28 for reloading purposes.

The guide head 28 is shown in more detail in FIG. 6 and includes a pair of guide members 78 forming a guide slot or track 80 of similar configuration to the feed slot 54 and constituting an extension of same. The guide members 78 differ principally from the feed bars 52, however, in that the members 78 terminate in a guide passage 82 having a cross-sectional shape generally similar to a segment of a circle. A guide and stop member 84 is located at the ends of the guide members 78 and includes a head stop portion 85 against which heads of the studs can abut and a plunger guide portion 86 (see also FIG. 2). The member 84 is integral with a lower supporting bar 88 which is suitably affixed to the web 34 of the yoke 24 by brazing or other suitable means.

A spacer 90 spaces the guide members 78 slightly above the bar 88 to enable the front projecting portion of the elongated spacer 60 of the magazine to be inserted between the guide members and the bar, as shown in FIG. 2. A setscrew 92 can be threadedly engaged in an opening 94 of the bar 88 to hold the spacer 60 in place and thereby hold the magazine supply 26 in end-to-end relationship with respect to the guide head 28. In this manner, the supply magazine 26 can be separated from the loader 12 simply by loosening the setscrew 92 and removing the spring pin 70 from the clips 68 of the pusher 62. The supply magazine 26 can then be removed and replaced with a loaded one or the supply magazine itself can be reloaded by means of a hopper, for example, and then re-assembled with the guide head 28. The magazine 26 can also be made of low cost plastic material, sheet metal, or both so as to be disposable. In such an instance, the magazine and studs are brought as a unit and the magazine thrown away when empty. In many instances, a friction fit between the spacer 60 and the members 78 and the bar 88 is sufficient without the use of the setscrew 92.

While the magazine 26 and the guide head 28 are shown as separable pieces, they can also be of one-piece construction. In such an instance both would be removed for loading, unless the magazine is to be loaded in place. If removed, there is greater danger of misaligning the magazine assembly with the chuck when replaced; this is particularly true for small studs and chucks having close tolerances. This danger does not exist with the separate guide head 28 permanently mounted in the yoke 24.

When the studs are pushed into the guide head 28, they are received by the plunger 30 and moved into the chuck 14. For this purpose, the plunger 30 includes a plunger rod 96 (FIG. 7) which includes bifurcated ends 98 forming a recess 100 which receives a shank 102 of a stud 104 when the stud is moved by the pusher 62 through the guide head 28 and into the recess 100 from the direction shown in FIG. 7. At this time, a head 106 of the stud 104 projects slightly above the ends 98 of the plunger rod 96 so that the head 106 can be engaged in a recess 108 (FIG. 8) of the chuck 14. The chuck 14 also has bifurcated ends 110 at the recess 108 to enable the chuck to frictionally and resiliently engage the head 106 of the stud 104 when pushed thereinto by the plunger rod 96. The plunger rod 96 also includes a flattened rear side 112 which lies against the guide surface 86 of the member 84 to hold the plunger rod 96 in a fixed, non-rotatable position. The cooperation between the flattened side 112 and the guide surface 86 also assures that a chamfered portion 114 of the rod 96 is presented toward the next stud to be loaded in the chuck, as shown in FIG. 2.

As the first stud engaged in the recess 100 is moved upwardly, the head of the next stud is pushed against the plunger rod 96. The chamfered portion 114, however, keeps the next stud from interfering with the loading operation. When the plunger rod 96 is returned to its lower position, after loading the stud in the chuck 14, the head of the next stud will project above the bifurcated ends 98 and enable the shank 102 to be received in the recess 100. Frictional engagement of a stud by the bifurcated ends 98 of the plunger rod 96 prevents the stud from slipping out when the loader 12 is in its withdrawn position.

The plunger rod 96 is moved from its receiving position as shown in FIG. 2 to a position in which the head of the stud is engaged in the recess 108 of the chuck 14 by pressing a button 116 against the workpiece or any other suitable object when the loader 12 has been moved into its operating position. This overcomes the force of a return spring 118 to move the plunger rod 96 in the desired direction. After the stud is engaged with the chuck, the button 116 is released and the spring 118 then returns the plunger rod to the stud-receiving position, at which time a shoulder 120 of the plunger rod 96 abuts a retainer 122 to restrict outward movement of the plunger rod. The plunger rod 96, after automatically receiving the next stud in the recess 100, due to the pressure of the pusher 62, is ready for another loading stroke after the next welding cycle.

While the operation of the loader 12 will be apparent from the above description, it will be briefly reviewed. The supply magazine 26 loaded with studs is positioned in end-to-end relation with the guide head 28 by inserting the spacer 60 into the space between the guide members 78 and the bar 88. The spring pin 70 is then engaged with the clips 68 to cause the pusher 62 to urge the studs toward the guide passage 82 and into the recess 100 in the plunger rod 96 when the plunger rod is in its outer or receiving position. When it is desired to load the chuck 14, the magazine supply 26 can be grasped by the welder to pivot the loader 12 about the pivot pins 36 and into the loading position, as determined by the adjustable stops 38. The plunger rod 96 is then moved toward the chuck 14 by pressing the botton 116 against a suitable object under a sufficient force to overcome the force of the return spring 118. The plunger rod 96 thereby moves the head 106 of the stud 104 into the recess 108 of the chuck 14 where it is frictionally held. The button 116 is then released to enable the return spring 118 to return the plunger rod 96 to the stud-receiving position, whereupon it receives the next stud with the shank 102 pushed into the recess 100. The loader 12 is then swung out of the way to the withdrawn position in which the magnet 48 holds the supply magazine 26. The stud in the chuck 14 is then welded to the workpiece and the chuck 14 then pulled away from the welded stud. The loader 12 can then be swung to its loading position again to load the chuck 14.

A slightly modified stud loader 124 is shown in FIG. 9. The stud loader 124 is substantially similar to the loader 12 except that it incorporates different means for moving the plunger rod 96 from the stud-receiving position to the chuck-loading position. With the stud loader 124, a pair of ears 126 are attached to the web 34 of the yoke 24. A lever 128 is then pivotally attached to the ears 126 by a suitable pin 130. The lever 128 includes a handle portion 132 which extends above the supply magazine 26 to be exposed for operation by the welder. At the opposite end, the lever 128 has a plunge rod-engaging portion 134 which abuts the end of the plunger rod 96.

Legs 136 connect the handle 132 and the plunge rod portion 134 on each side of the supply magazine 26 to enable loading and unloading of the supply magazine. In this instance, the spacer 60 of the supply magazine 26 can be frictionally engaged between the guide members 78 and the bar 86 with the setscrew 92 not being necessary.

An overriding spring 138 is located between the rod-engaging portion 134 of the lever 128 and the web 34 of the yoke 24. This spring holds the lever 128 in the position shown until the loader 124 is moved to its loading position. Thereupon, further pressure upon the handle 132 of the lever 128 overcomes the force of the spring 138 and causes the portion 134 to move the plunger rod 96 toward the chuck 14 and thereby perform a loading stroke. Hence, the operation can be effected simply by pushing on the handle 132 both to move the loader to its loading position and also to then effect movement of the plunger rod 96. This eliminates the extra step of pressing the button 116 against an object after the loader 12 is moved to its loading position.

Another modified stud loader 140 is shown in FIG. 10. The stud loader 140 is similar to the loader 12 but is completely separate from the tool 10, rather than pivotally connected thereto. In this instance, the loader 140 has an auxiliary guide member 142 affixed to the top of the guide head 28 with a recess 144 to receive the spark shield 16 and thereby align the chuck 14 and the plunger rod 96. The guide member 140 thus aligns the loader and tool in place of the yoke 24 and its associated components.

The loader 140 can be carried and controlled by means of a handle 146 attached to the loader by a yoke element 148. In the position shown, the loader 140 is about to be moved into the loading position with the shield 16 inserted in the recess 144. In the position shown, the loader 140 can also be moved to a withdrawn or inoperative position out of the way of the chuck 14.

Various modifications of the above-described embodiments of the invention will be apparent to those skilled in the art, and it is to be understood that such modifications can be made without departing from the scope of the invention, if they are within the spirit and the tenor of the accompanying claims.

What I claim is:

1. A stud loader for sequentially loading studs in a chuck of a hand-operated stud welding tool, said loader comprising a guide head having track means to receive a stud, a magazine having track means for holding a plurality of oriented studs, means detachably connecting said magazine to said head with both of said track means in alignment, means for pivotally connecting said guide head and said magazine to the tool to enable pivotal movement of said guide head and said magazine between a first position in which a stud carried by said guide head is aligned with said chuck and a second position in which said magazine and said guide head are out of the way of said chuck, stop means for stopping the pivotal movement of said head and said magazine when said head is in the first position to align a stud held thereby with the chuck, means carried by said tool and engageable with said magazine to hold said guide head and said magazine in the second position out of the way of said chuck, resilient means associated with said magazine for urging the studs in said magizine toward said guide head, and means for effecting relative movement of a stud positioned in said guide head and the chuck toward and into engagement with one another.

2. A hand-operated welding device comprising a chuck for holding a stud, means for retracting said chuck, means for moving said chuck rapidly in the opposite direction to plunge a stud carried by said chuck against a workpiece, means for supplying power to said chuck, control means for controlling said power supply means, a guide head, a magazine movable with said guide head, means movably connecting said magazine and said guide head to said tool for movement between a first position in which a stud carried by said guide head is aligned with said chuck and a second position in which said magazine and said guide head are out of the way of said chuck, and means carried by said guide head and movable independently thereof for moving a stud carried by said guide head axially toward said chuck.

3. A welding device according to claim 2 wherein said last-named means constitutes a plunger carried in said guide head and movable in a lineal path toward and away from the chuck.

4. A device according to claim 3 characterized by resilient means associated with said plunger for urging said plunger away from the chuck.

5. A stud loader for sequentially loading studs in a chuck of a hand-operated stud welding tool, said loader comprising a guide head having guide track means to receive studs and having a guide passage extending transversely of said track means to sequentially receive studs from said track means, a magazine attached to said guide head and having feed track means aligned with said guide track means, means associated with said magazine for urging studs along said feed track means and said guide track means to said guide passage, means associated with said loader for aligning said guide passage with the chuck, and means carried by said guide head and movable independently of said guide head and longitudinally in said guide passage to move a stud from said guide passage beyond said guide head and axially toward the chuck.

6. A device according to claim 5 wherein said last-named means comprises a plunger having an end adapted to engage a stud in said guide passage means when in one position, resilient means associated with said plunger for urging said plunger beyond the one position in a direction away from the chuck, and stop means movable with said plunger to prevent said resilient means from moving said plunger beyond said one position.

7. A hand-operated welding device comprising a chuck for holding a stud, means for retracting said chuck, means for moving said chuck rapidly in the opposite direction to plunge a stud carried by said chuck against a workpiece, means for supplying power to said chuck, control means for controlling said power supply means, a guide head, a magazine movable with said guide head, means movably connecting said magazine and said guide head to said tool for movement between a first position in which a stud carried by said guide head is aligned with said chuck and a second position in which said magazine and said guide head are out of the way of said chuck, and a plunger carried by said guide head and movable independently of said guide head in a lineal path toward and away from the chuck, said plunger having a recess in the end thereof directed toward the chuck for receiving a shank of the stud.

8. A hand-operated welding device comprising a chuck for holding a stud, means for retracting said chuck, means for moving said chuck rapidly in the opposite direction to plunge a stud carried by said chuck against a workpiece, means for supplying power to said chuck, control means for controlling said power supply means, a guide head, a magazine movable with said guide head, means movably connecting said magazine and said guide head to said tool for movement between a first position in which a stud carried by said guide head is aligned with said chuck and a second position in which said magazine and said guide head are out of the way of said chuck, a plunger carried in said guide head and movable independently of said guide head in a lineal path toward and away from the chuck, and lever means pivoted with respect to said guide head and capable of being manipulated by an operator to force said plunger toward said chuck.

References Cited by the Examiner

UNITED STATES PATENTS

| | | | |
|---|---|---|---|
| 2,447,113 | 8/1948 | Candy | 219—98 |
| 2,640,133 | 5/1953 | Ainsworth et al. | 219—98 |
| 3,061,714 | 10/1962 | Van Scriver | 219—103 |

FOREIGN PATENTS

| | | |
|---|---|---|
| 806,526 | 12/1958 | Great Britain. |

OTHER REFERENCES

IBM Tech. Disclosure Bulletin, August 1958, vol. 1, No. 2, page 17.

RICHARD M. WOOD, *Primary Examiner.*

R. F. STAUBLY, *Assistant Examiner.*